United States Patent
Barnard et al.

(10) Patent No.: US 7,228,236 B2
(45) Date of Patent: Jun. 5, 2007

(54) SUBARRAY MATCHING BEAMFORMER APPARATUS AND METHOD

(75) Inventors: Thomas J. Barnard, Liverpool, NY (US); Manuel Francisco Fernandez, Madison, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 741 days.

(21) Appl. No.: 10/182,664

(22) PCT Filed: Jan. 8, 2001

(86) PCT No.: PCT/US01/00489

§ 371 (c)(1),
(2), (4) Date: Jan. 13, 2003

(87) PCT Pub. No.: WO01/50406

PCT Pub. Date: Jul. 12, 2001

(65) Prior Publication Data

US 2006/0241914 A1    Oct. 26, 2006

Related U.S. Application Data

(60) Provisional application No. 60/174,721, filed on Jan. 6, 2000.

(51) Int. Cl.
*G01V 1/28* (2006.01)
*G06F 33/48* (2006.01)

(52) U.S. Cl. .......................................... 702/14; 702/17
(58) Field of Classification Search .............. 702/4–16, 702/17; 367/12, 123, 130; 347/147
See application file for complete search history.

(56) References Cited

U.S. PATENT DOCUMENTS

| | | | | |
|---|---|---|---|---|
| 4,965,732 A | * | 10/1990 | Roy, III et al. | 347/147 |
| 5,481,505 A | * | 1/1996 | Donald et al. | 367/130 |
| 5,528,554 A | * | 6/1996 | Posch et al. | 367/12 |
| 5,680,371 A | * | 10/1997 | Miklovic | 367/123 |
| 5,914,912 A | | 6/1999 | Yang | |
| 6,446,008 B1 | * | 9/2002 | Ozbek | 702/17 |

OTHER PUBLICATIONS

International Search Report dated Mar. 22, 2001 for PCT Application No. PCT/US01/00489 (6 pages).

* cited by examiner

*Primary Examiner*—Michael P. Nghiem
*Assistant Examiner*—Victor J. Taylor
(74) *Attorney, Agent, or Firm*—Plevy, Howard & Darcy, PC

(57) ABSTRACT

A method of beam forming an array, by computer processing a cross covariance, of the reference sub array seismic signal data signal, by having an unknown shape comprising receiving acoustic signals, via the array, and computing the data and segmenting the array into an initial segment of a known shape and at least a second segment, and beam forming the initial segment to provide a beam formed output, and using the beam formed output to obtain weights, for the second segment of the array.

12 Claims, 3 Drawing Sheets

SUBARRAY MATCHING BEAMFORMER APPARATUS AND METHOD

RELATED APPLICATION

This application claims priority of U.S. Patent application 60/174,721, entitled SUBARRAY MATCHING BEAMFORMER (SMB) ALGORITHM, filed Jan. 6, 2000, the entire disclosure of which is incorporated by reference herein.

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention The present invention relates generally to tracking systems and more specifically to sonar systems for tracking targets emitting acoustic signals.

BACKGROUND OF THE INVENTION

Conventional passive sonar systems detect acoustic signals emanating from an "underwater object;" that is, any device that moves through the water while emitting acoustic signals that sonar can detect. Torpedoes and submarines are examples of such "underwater objects." Sonar systems employ a variety of technologies to detect and locate such underwater objects. Generally, however, acoustic signals from a specific object define a complex wavefront and pass a towed horizontal array or a stationary vertical array of hydrophones at different times. U.S. Pat. No. 4,965,732 to Roy et al. for Methods and Arrangements for Signal Reception and Parameter Estimation and U.S. Pat. No. 5,216,640 to the same inventors as in this application for an Inverse Beamforming Sonar System and Method are examples of such sonar systems. Some sonar systems, implement a beamforming process to correlate the signals received at each hydrophone and to decompose these signals into a signal representing the bearing to a particular underwater object.

Generally, for a linear array of hydrophones towed behind a vessel such as a surface ship or submarine, the longer and straighter that linear array is, the better one can focus those elements of the array to "look" in a particular direction. A problem arises, however, during ship maneuvers wherein a course change causes a distortion of the towed array. If one does not know the array shape while the array is distorted, target tracking and focus is impaired.

Prior compensation techniques for the aforementioned problem include estimating the array shape based on the vessel's own change in course and resulting path through the water, and providing heading sensors on each of the hydrophone array elements, for example. Models that estimate array shape based on course maneuvers have proved problematic to implement and in certain cases invalid (e.g. for long arrays of about 400 hydrophones, or more) as empirical data tends to show that a towed array does not follow the channel formed by the vessel during own ship maneuvers. Moreover, during severe maneuvers, heading sensors disposed on the hydrophones are extremely inaccurate and hence do not provide adequate information to accurately track contacts during such periods. In tactical situations, such as tracking a potentially hostile target, a relatively severe maneuver may be necessary to evade an action by the target (e.g. a torpedo fire). It is most desirable to maintain the track of the target through the maneuver.

Another technique, commonly called the "bright star technique", utilizes a known strong signal emanating, for example, from a noisy surface ship. In this method, a large number of possible array shapes are processed and the signal data is beamformed based on the input array shapes. The strongest response in the direction of the strong signal is used to focus the beam in that direction. This approach, however, requires both a strong signal and a relatively long time interval for focusing and adjusting the input array parameters to arrive at a focused output beam. In many tactical situations, however, neither a strong target nor a long conversion time is available. Accordingly, it is highly desirable to obtain a system and method for quickly and efficiently maintaining the track of a target when the array shape is unknown and/or when heading sensor data is unreliable or unavailable.

SUMMARY OF THE INVENTION

A method of beamforming an array having an unknown shape comprising receiving acoustic signals via the array; segmenting the array into an initial segment of a known shape and at least a second segment; beam forming the initial segment to provide a beam formed output; and using the beam formed output to obtain weights for the second segment of the array.

A method of locating an object emitting acoustic signals comprising receiving acoustic signals from the object via an array of elements; segmenting the array into a first portion and at least a second portion; beamforming the first portion of the array to obtain beamformed outputs; determining weights associated with the second portion such that a beamformed output of at the second portion approximates the beamformed output of the first portion; and applying the determined weights to the second portion of the array.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DETAILED DESCRIPTION OF THE INVENTION

The method and system of the present invention allows for beamforming an array of unknown shape. To steer the array towards a particular direction, a processor first computes the standard adaptive weight vector across a subarray chosen small enough to assume negligible loss due to the distorted shape. Next, by utilizing the cross-covariance between this small subarray and the remaining elements of the array, the processor maps the short vector to a lengthened one which serves as an estimate of the steering weights for the main portion of the array. Note that this lengthened weight vector is obtained absent any information about the location of the array elements.

Figure 1:
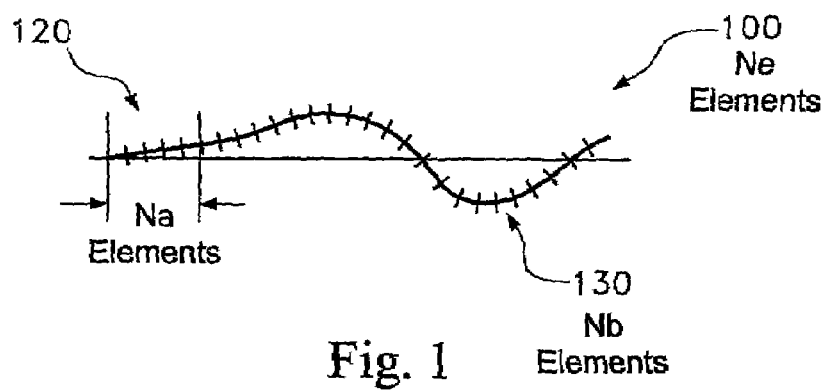
FIG. 1 is a schematic illustration of an array of hydrophone elements distorted into an unknown shape from which the subarray beamforming technique of the present invention operates to resolve contact information received from the elements of the array.
Figure 2:
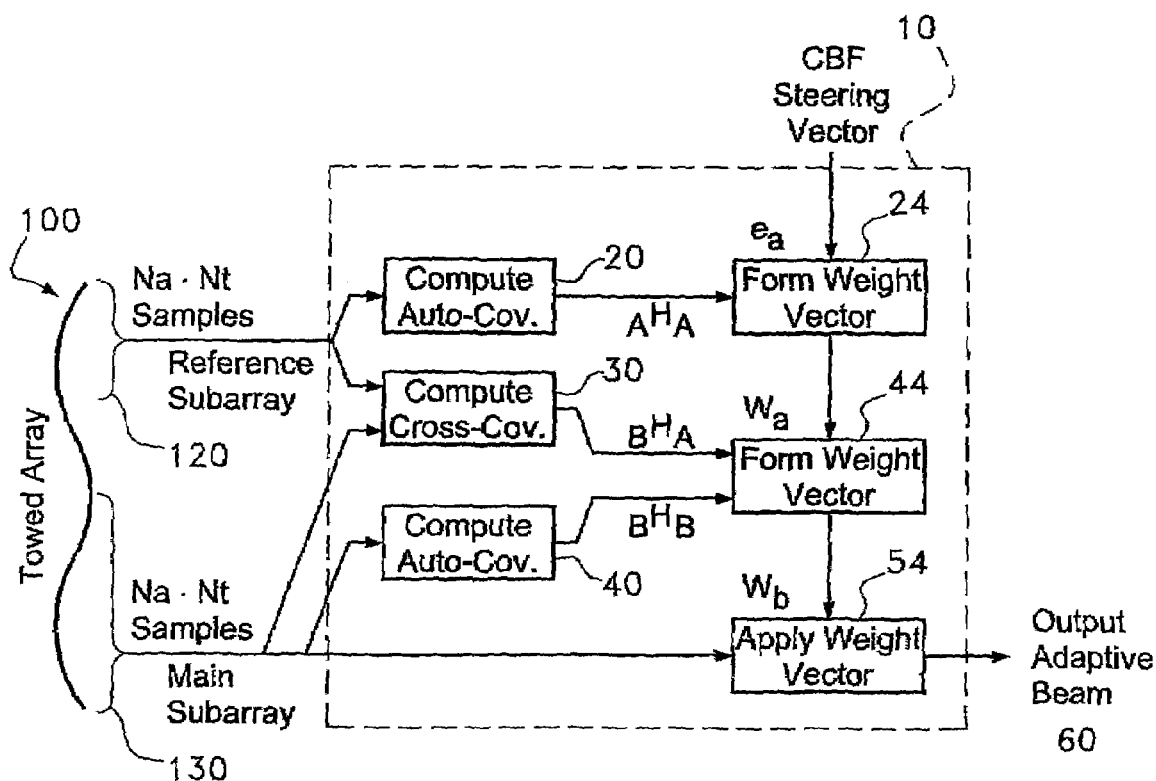
FIG. 2 is schematic illustration of the functional blocks associated with subarray matching beamformer processing according to the present invention.

Referring now to the drawings, and in particular to FIGS. 1 and 2, wherein like reference numerals are used to indicate like parts, there is shown an apparatus 10 embodied in a sonar system for deriving adaptive weights for processing acoustic data received from an array 100 of hydrophones.

As shown in FIG. 1, an array 100 of unknown shape comprises $N_e$ hydrophone elements for receiving acoustic data from a target to be tracked (not shown). According to an aspect of the present invention, the apparatus resolves contacts received on an array of unknown shape. As is understood, this may result when the towing vessel performs a maneuver, resulting in a distortion of the array 100. For example, assuming array 100 of $N_s$ elements receives $N_t$ samples of data on each hydrophone element, the apparatus according to an aspect of the present invention partitions the array (and the data samples associated with the corresponding hydrophone elements) into at least two segments. The first segment 120 is small enough for one to assume a substantially straight or linear relationship associated with the elements $N_a$ in the first subarray. The remainder 130 of array 100 comprises $N_b$ elements, as shown in FIG. 1. Spectral processing is performed on the data received by the array 100 in conventional fashion such that spectral FFTs are performed across time samples on each of the sensor elements. Processor 10 receives the data samples received on the $N_a$ elements of subarray 120 and stores the data in a matrix A of size and $N_a \times N_t$. Traditional adaptive beamforming is performed on the data associated with this first subarray 120 such that a conventional steering vector for this portion of the array is formed based on a straight array assumption. An adaptive weight vector associated with subarray 120 for this look direction is determined as:

$$w_a = (A^H A)^{-1} e_a / [e_a^H (A^H A)^{-1} e_a]$$ (Equation 1)

based on the expected phase shifts associated with the spaced array elements. As shown in FIG. 2, covariance processor 20 performs autocovariance processing on the data samples from reference subarray 120 to obtain matrix data AA. Note that in the above, the H superscript denotes conjugate transpose.

As shown in FIG. 2, processor 10 also receives data samples from the remainder of the array (i.e., main subarray 130) and stores the data samples in a matrix of size $N_b \times N_t$. The processor computes the auto covariance associated with this data to obtain matrix data $B^H B$. Processor 10 operates to find a weight vector $W_e$ of size $N_b \times 1$ for the other elements of the array 100. Note that in general $N_e = N_a + N_b$, however this does not always have to be the case, as the subarray matching beamforming apparatus of the present invention does not have to utilize the entire array. In any event, processor 10 determines the weight vector We such that the beamformed output of main subarray 130 matches that of the output from reference subarray 120. That is, the weight vector is determined such that the beamformed output of subarray 130 minimizes the magnitude of:

$$|Aw_a - Bw_b| = (Aw_a - Bw_b)^H (Aw_a - Bw_b)$$ (Equation 2)

Thus, the vector which minimizes this magnitude is given as $$W_b = (B^H B)^{-1} (B^H A) W_a$$ (Equation 3)

where $B^H B$ represents the auto covariance of the main subarray 130 and $B^H A$ represent the cross covariance of the main subarray and reference subarrays, respectively. The weight vector $W_b$ formed is then applied to the data samples associated with the main array such that an output adaptive beam 60 is provided for tracking the target.

Note that derivation of the weight $W_b$ requires no knowledge of the element locations on the main subarray 130. Thus, the processor according to the present invention maps the vector derived based on an assumed wave shape, $W_a$, to one which covers the larger subarray of unknown shape.

As previously mentioneed, FIG. 2 shows a functional block diagram of the processing described above wherein data samples $N_t$ from subarray 120 are received and an auto covariance operation is performed on these samples to provide an auto covariance matrix $A^H A$ using traditional ABF processing. Signal processor module 24 receives the auto covariance output from the reference subarray as well as conventional beamforming steering vector $e_a$ to form the adaptive weight vector $W_a$. In similar fashion, autocovariance module 40 receives data samples from the main subarray 140 and computes the auto covariance associated with the main subarray elements to obtain matrix $B^H B$. Cross covariance processor 30 receives as input data samples from both the reference subarray and the main subarray to compute the cross covariance matrix $B^H A$ which is output from the processor and used to form weight vector $W_b$ via signal processor module 44. Signal processor module 54 then applies each of the weight vectors $w_b$ to the main subarray to obtain output adaptive beam signal 60.

Note that in the preferred embodiment, the above processing is implemented in software within a signal processor such as the AN/UYS-1 Advanced Signal Processor, AN/UYS-2 Enhanced Modular Signal Processor or other signal processing and signal conditioning devices commonly used, implemented and well known to those skilled in the art.

This approach has a strong advantage over the basic shape estimation techniques in that other algorithms require the presence of a strong contact upon which to focus the array. The subarray matching beamforming technique disclosed herein does not require such a contact. In fact, simulated results reveal that the novel technique can resolve weak contacts below the noise floor of the first stage of the subarray.

The method described above has utility in other areas besides shape estimation. For instance, in ultrasonic imaging, an inhomogeneous media can induce significant wavefront distortion. Similar distortions appear in shallow water ASW data due to severe multipath propagation. By utilizing a subarray chosen small enough to assume negligible distortion, the processor can resolve data across the rest of the array.

It is understood that a long array is generally desirable in order to: 1) improve resolution; and 2) increase angular accuracy. In the present invention, the mapping of the shortened array vector to the longer array which serves as an estimate of the steering weights for the main portion of the array operates to boost the signal power relative to the noise for the entire array. Thus, while the technique disclosed herein does not improve resolution, the sginal gain is equal to the gain of the entire array. This enables one to maintain tracking of even a weak contact because the array gain is not compromised using the disclosed beamforming technique. Adaptive beamforming on the initial segment may be used to improve overall resolution.

Figure 3:
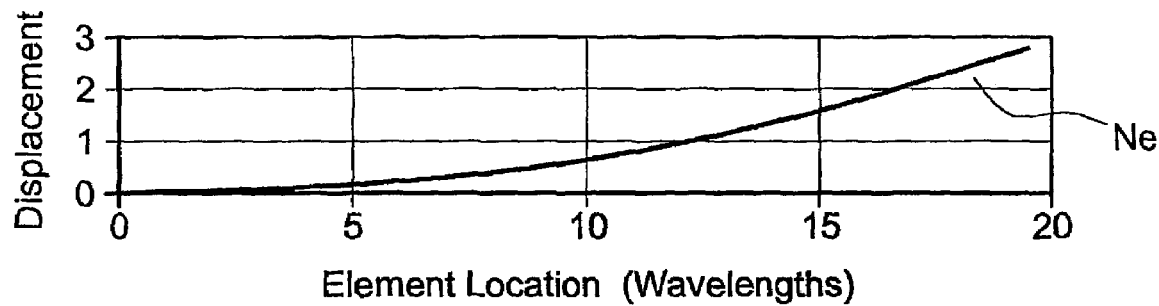
FIG. 3 is a graph of a curved array of uniformly spaced hydrophone elements useful in understanding the present invention
Figure 4:
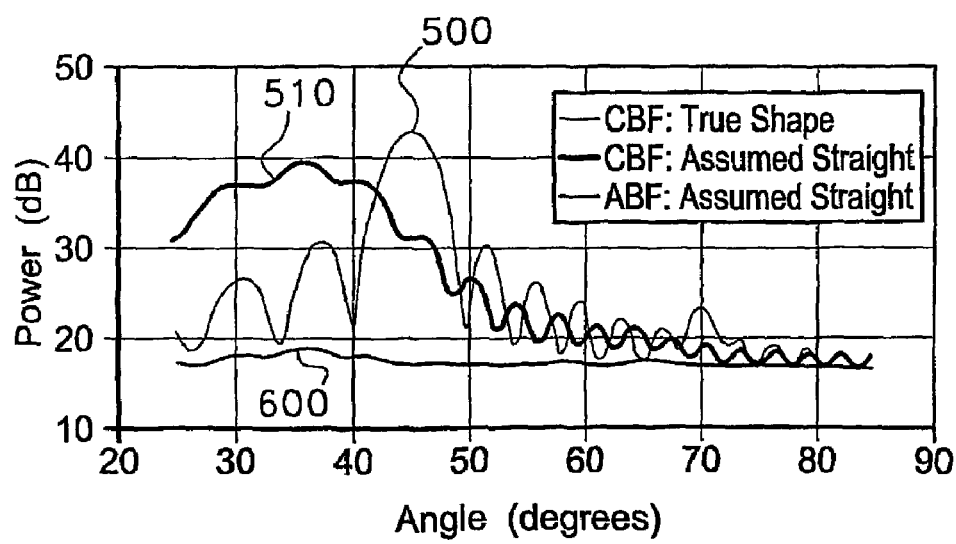
FIG. 4 is a graph depicting the results of conventional beamforming techniques on simulated data containing two contacts for detection.

In order to illustrate the utility of the SMB method and apparatus disclosed herein, consider 50 elements uniformly spaced at d/λ=0.40 and curved along the arc of a circle, as shown in FIG. 3. A simulator creates data received on this array with two contacts; a first strong contact at 45° (10 dB SNR) masking a weaker contact signal at 70° (−15 dB SNR). FIG. 4 shows the results of beamforming this data after assuming co-linear elements. As shown herein, a conventional beamformer (CBF) cannot resolve the weaker contact, and an adaptive beamformer (ABF) cannot even resolve the stronger contact.

Figure 5:
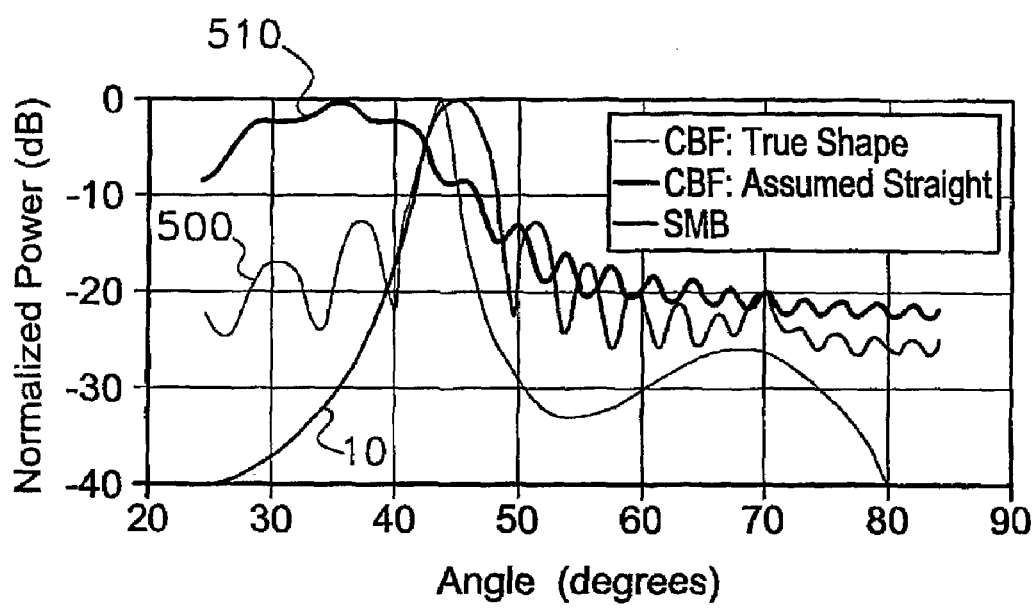
FIG. 5 is a graph contrasting the results obtained from subarray matching beamforming on simulated data containing two contacts for detection according to the present invention relative to conventional beamforming techniques for the same data.

FIG. 5, however, shows the same data as processed using the subarray matching (SMB) technique according to the present invention. In this case, both the CBF and SMB bearing response patterns have been normalized by the peak power. Note that some for of bearing normalization processing is also applied to the SMB technique in conventional fashion due at least in part to the lack of constraints on the weight vector We. In general, a two pass AGC is preferred. As seen in the figure, the SMB process uncovers the weaker contact and resolves the strong contact to a narrower width than the ideal CBF.

Figure 6:
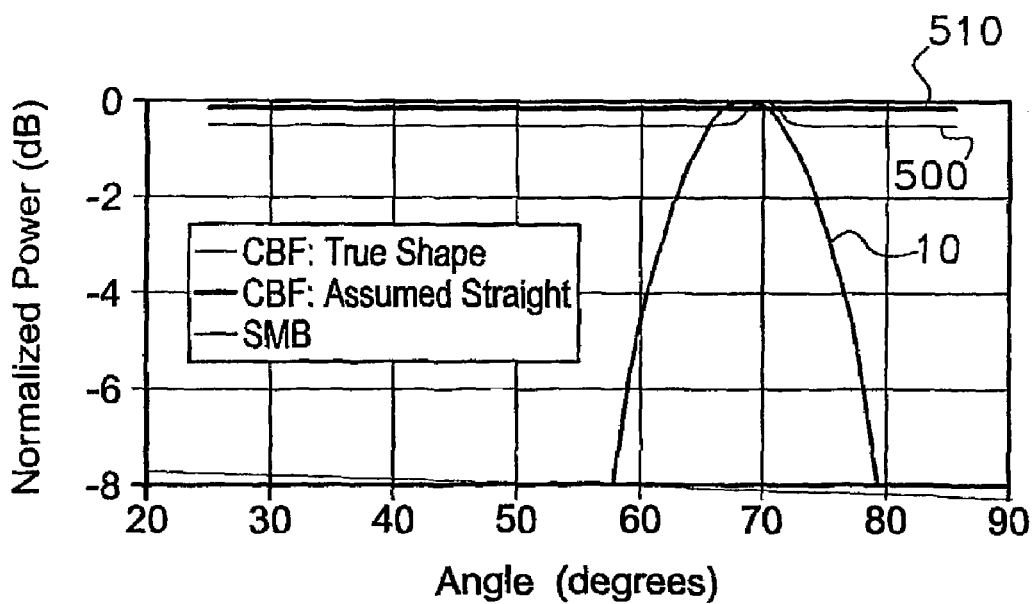
FIG. 6 is a graph contrasting the results obtained from subarray matching beamforming on simulated data containing a single weak contact in white noise for detection according to the present invention relative to conventional beamforming techniques for the same data.

There are numerous advantages to the SMB approach described herein. First, the process does not require a strong signal to estimate the shape of an array. For example, FIG. 6 shows the results of data processing when presented with a single weak contact in white noise. As seen, the SMB process uncovers the weak signal. In addition, although the algorithm does not apply the final weight vector to the entire array, the SMB preserves or exceeds the full array gain. This occurs because the SMB cancels uncorrelated data, and thereby lowers the noise floor, as shown in FIGS. 5 and 6. That is, cross covariance processor 30 (FIG. 2) returns zeros when uncorrelated noise is input thereto. Furthermore, the algorithm back-fits to existing platforms without requiring additional hardware or instrumentation in contrast to traditional shape estimation algorithms which require additional heading sensors which may or may not exist.

The process disclosed herein has applications beyond towed array shape estimation. First, the algorithm adapts to the data when individual array elements fail. More specifically, if a component within the element fails and causes output signal attenuation, conventional beamforming degrades because it assumes uniform signal strength across the array. The subarray matching beamforming process according to the present invention requires no such assumption, and treats unknown attenuation on the elements in the same fashion as the unknown location; the cross covariance with the reference subarray allows for creation of a matching weight vector that preserves the array gain.

Also, application of the algorithm according to the present invention improves the resolution of medical images degraded by the inhomogeneous nature of human flesh. The algorithm also improves the resolution of shallow water ASW images distorted by severe multipath. In both of these applications, the distorted wavefront affects a conventional beamformer in the same fashion as an unknown array shape. As the true shape deviates from linear (or as the incoming wavefront becomes more distorted), the conventional beamformer looses the ability to focus, or "look" in a specific direction. The algorithm restores this ability to the level of that achieved by adaptively beamforming the reference subarray. Applications also exist in the field of sonobuoy processing, where the algorithm allows for beamforming between randomly dispersed buoys. Application may also be made to the field of radio astronomy where the sensor position (e.g. antenna position) may be known, but the atmosphere disturbs or distorts the wavefront such that compensation for distortion of the signal data is required. The SMB process disicosed herein serves as a robust multipurpose beamforming process when presented with distorted and/or degraded data.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A method of beam forming an array of acoustic sensors having an unknown shape comprising:
   receiving acoustic signals via said array;
   segmenting the array into an initial segment of acoustic sensors, said initial segment having a known shape, and at least a second segment of acoustic sensors of said array, said initial segment having a length less than the length of the corresponding at least second segment of said array;
   beam forming the initial segment to provide a beam formed output; and
   using said beam formed output to obtain weights for the at least second segment of the array.

2. The method of claim 1 further comprising the step of applying said obtained weights to said at least second segment.

3. The method of claim 1 wherein said known shape of said initial segment of acoustic sensors is a substantially straight line.

4. The method of claim 1 wherein said array of acoustic sensors comprises an array of hydrophones.

5. The method of claim 1, wherein the step of beam forming the initial segment comprises determining an adaptive weight vector for said initial segment and wherein the step of obtaining said weights for said at least one second segment comprises matching the beam formed output of said initial segment.

6. A method for locating an object emitting acoustic signals comprising:
   receiving acoustic signals from the object via an array of acoustic elements;
   segmenting said array into a first portion of acoustic sensors, said first portion having a known linear shape, and at least a second portion of acoustic sensors of said array, said first portion having a length less than the length of the corresponding at least second portion of said array;

beam forming the first portion of the array;
determining weights associated with said at least second portion such that a beam formed output of at least said second portion approximates the beam formed output of the first portion; and
applying said determined weights to said second portion of said array.

7. The method according to claim 6 wherein said array is an array of hydrophone array elements.

8. The method according to claim 6 wherein the step of determining said weights associated with said at least second portion comprises determining a cross variance associated with the acoustic signals received from said first portion and said at least second portion.

9. In an acoustic detection system comprising an array of hydrophones, a method of determining adaptive weights for a given subarray within said array of hydrophones comprising:
partitioning said array into a sequence of subarrays, including a reference subarray comprising a substantially straight line segment of hydrophones, and at least one other subarray of hydrophones, said reference subarray having a length less than the length of the corresponding at least one other subarray;
beam forming said reference subarray of hydrophones to obtain a weight vector associated with said reference subarray;
using said weight vector of said reference subarray to form an adaptive weight vector associated with at least one of said sequence of other subarrays; and
storing said adaptive weight vector.

10. The method according to claim 9 further comprising the step of determining a cross-variance of said reference subarray signal data with said signal data from at least one of said sequence of other subarrays to obtain said adaptive weight vector.

11. In an acoustic detection system comprising an array of acoustic sensors, a method of determining adaptive weights for said array, said method comprising:
receiving acoustic signals via said array;
partitioning said array into a first portion of acoustic sensors, said first portion having a known shape, and at least a second portion of acoustic sensors of said array, said first portion having a length less than the length of the corresponding at least second portion of said array;
performing autocovariance processing of data samples indicative of said acoustic signals received at said portion to obtain a first weight vector associated with said first portion;
generating a cross-variance matrix using data samples indicative of said acoustic signals received at said first portion and data samples indicative of said acoustic signals received at said at least second portion;
generating an autocovariance matrix using said data samples received at said at least second portion;
determining an adaptive weight vector based on said first weight vector, said cross-covariance matrix and said autocovariance matrix; and
storing said adaptive weight vector.

12. The method of claim 11, further comprising adaptively beam forming the data samples received at said at least second portion using said determined adaptive weight vector.

* * * * *